Figure 1:
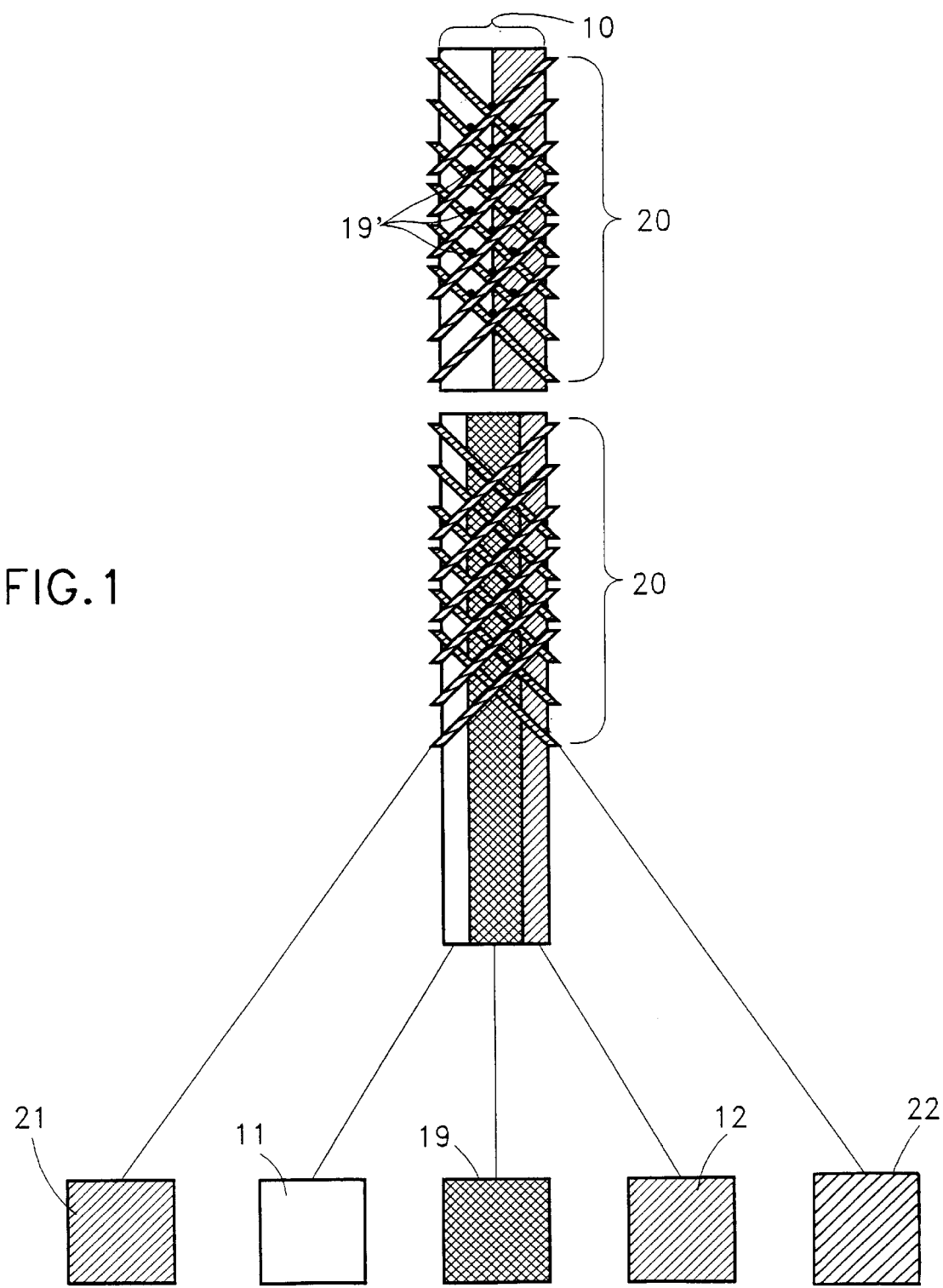

United States Patent [19]

Lorch

[11] Patent Number: 5,771,673
[45] Date of Patent: Jun. 30, 1998

[54] LINE, IN PARTICULAR FISHING LINE, AS WELL AS METHOD FOR ITS PRODUCTION

[75] Inventor: Wilhelm Lorch, Winterlingen, Germany

[73] Assignee: Lozetex-Zwirne GmbH, et al, Winterlingen, Germany

[21] Appl. No.: 676,379

[22] PCT Filed: Jan. 21, 1995

[86] PCT No.: PCT/DE95/00085

§ 371 Date: Jul. 18, 1996

§ 102(e) Date: Jul. 18, 1996

[87] PCT Pub. No.: WO95/20703

PCT Pub. Date: Aug. 3, 1995

[30] Foreign Application Priority Data

Jan. 31, 1994 [DE] Germany .......................... 44 02 630.7

[51] Int. Cl.$^6$ .................................................. D02G 3/36
[52] U.S. Cl. ................................. 57/234; 57/232; 57/240
[58] Field of Search ............................ 43/44.98; 57/210, 57/230, 232, 234, 242; 156/308.2, 309.6

[56] References Cited

U.S. PATENT DOCUMENTS

| | | | |
|---|---|---|---|
| 2,313,058 | 3/1943 | Francis, Jr. ................................. | 57/210 |
| 4,275,117 | 6/1981 | Crandall ..................................... | 57/210 |
| 4,287,714 | 9/1981 | Takai ......................................... | 57/210 |
| 4,299,884 | 11/1981 | Payen ........................................ | 57/210 |
| 4,381,639 | 5/1983 | Kress ......................................... | 57/210 |
| 4,384,449 | 5/1983 | Byrnes, Sr. et al. ....................... | 57/210 |
| 4,470,251 | 9/1984 | Bettcher ..................................... | 57/210 |
| 5,010,723 | 4/1991 | Wilen ......................................... | 57/210 |
| 5,572,860 | 11/1996 | Mitsumoto et al. ....................... | 57/210 |

FOREIGN PATENT DOCUMENTS

| | | |
|---|---|---|
| A0119287 | 9/1984 | European Pat. Off. . |
| A583214 | 1/1925 | France . |
| 2477583 | 9/1981 | France ..................................... 57/225 |
| A2652826 | 4/1991 | France . |
| 3140103 | 4/1983 | Germany . |
| 81295057 | 12/1985 | Germany . |
| 3701503 | 8/1987 | Germany . |
| 3196732 | 8/1988 | Japan ....................................... 57/210 |
| 405186924 | 6/1993 | Japan ....................................... 57/225 |
| A1228171 | 4/1971 | United Kingdom . |
| A2187217 | 9/1987 | United Kingdom . |
| WO92 03922 | 8/1991 | WIPO . |

Primary Examiner—William Stryjewski
Attorney, Agent, or Firm—Lackenbach Siegel Marzullo Aronson & Greenspan, P.C.

[57] ABSTRACT

A fishing line comprising a core (10) and a sheath (20) encompassing the core (10). the core (10) as well as also the sheath (20) are constructed of high-strength filaments (11, 12, 21, 22). The core (10) is entwined with the filaments (21, 22) forming the sheath (20). the composite of the filaments (11, 12, 21, 22) is set by bonding by means of a fusion-adhesive yarn (19) placed parallel to the filaments (11, 12) forming the core (10). In this way a fishing line can be produced which meets the highest requirements and is simultaneously cost effective.

14 Claims, 2 Drawing Sheets

LINE, IN PARTICULAR FISHING LINE, AS WELL AS METHOD FOR ITS PRODUCTION

The invention relates to a line, in particular a fishing line, and to a method for the production of such line.

In the case of lines, in particular fishing lines, one differentiates between two different basic concepts, namely monofilic lines, on the one hand, and braided lines, on the other hand.

Monofilic lines have been known for a long time and are available in various implementations. In their fundamental structure they consist of a monofilament which, as a rule, is coated. In DE 24 16 488 A1 using as an example a fishing line, it is suggested to provide a monofilament with a twofold coating wherein the first coating comprises microvoids to increase the buoyancy and the second superjacent coating is to ensure the desired fatigue strength. Further examples of monofilic fishing lines are disclosed in GB 1 526 755 and U.S. Pat. No. 5,207,732. In both of the latter cases a core comprising nylon is used which is said to ensure the desired fatigue strength. Additional coatings are provided in order to achieve sufficient durability and to lend sufficient intrinsic stiffness to the fishing line.

Such monofilic fishing lines are very cost-effective, they have, however, a comparatively low bearing capability and are subject to high wear-and-tear. For this reason they are only suitable for specific less demanding application purposes.

Furthermore, braided lines are available which have a core and a sheath encompassing the core. The core as well as also the sheath are formed of high-strength filaments. Such line in the form of a fishing line is, for example, described in DE 81 29 505 U1. It comprises a textile core of a large number of synthetic textile fibers of high strength, namely for example aramide fibers. The aramide fibers extending essentially axially are encompassed by a braiding of special steel wire. This permits implementing a fishing line of high strength and bearing capability which is simultaneously flexible which is a particularly important desired characteristic.

A comparable fishing line is disclosed in GB 1 399 995. Therein a core comprising textile filaments is embraided by filaments which are also textile filaments and is subsequently coated to protect it against damage.

However, of disadvantage in the embraided fishing lines is their high price brought about through the expensive embraiding of the core. They are therefore only used for very specific application purposes which cannot be served by the monofilic fishing lines. Within this scope should also be understood as cast leader the specific application of the fishing line known from DE 81 29 505 U1 since the issue there is to ensure sufficient biting strength of the fishing line.

The invention therefore addresses the problem of further developing a line, in particular a fishing line, of the initially cited type such that it no longer comprises said disadvantages. A line, in particular a fishing line, was to be created which has high bearing strength with low wear-and-tear and simultaneously is produced cost-effectively. It should, in particular, be universally applicable and easy to handle.

The invention is based on the idea of forming the sheath by entwining the core with filaments and to stabilize the line by bonding. Such line can be fabricated extremely cost-effectively since the entwining can be accomplished in simple ways. In addition, it is possible to optimize exactly the structure in view toward strength, mechanical properties, purpose of application etc. since with respect to the realization of the core as well as also in particular with respect to the sheath hardly any restrictions exist. Through the corresponding selection of the filaments forming the sheath and the number of twining turns properties such as resistance to tearing, stretching behaviour, volume, density, stiffness or optical quality can be varied.

It is especially advantageous if the bonding is realized with a fusion-adhesive yarn, which is integrated into the line and completely fused and incorporated in the finished product. This yields an ideally homogeneous and elastically resilient property, in particular if the fusion-adhesive yarn was placed during the fabrication essentially parallel to the filaments forming the core. The filament bond is strengthened during the melting from the inside, the incorporated fusion-adhesive yarn is no longer visible to the naked eye. The surface of the line, in particular its appearance, is not changed through this type of bonding. The fusion-adhesive yarn also does not change the remaining properties, in particular the mechanical properties of the filaments, and their resistance to chemical effects so that the application properties of the line, which are characterized by the properties of the individual filaments used, are not effected disadvantageously. This is of particular importance for critical purposes of application, for example in big game fishing or when fishing in salt water with such a line.

Depending on the requirement, the core can be entwined multiply and alternatingly in the Z-direction (left) and in the S-direction (right). In this way it is possible to realize a sheath constructed in multilayers in order to apply, for example, different types of filaments successively which yield specific desired overall properties of the fishing line. As filaments forming the sheath are especially suitable high-performance filaments based on polyethylene with an ultrahigh molecular weight (so-called UHMW-PE). These are distinguished by extremely high strength and are specifically lighter than water. They therefore lend to the fishing line the desired buoyancy.

Alternatively or in combination with the above described high-performance filament can be used metal threads. Such metal threads are available for example as standardized goods in the form of bright-soft stainless steel wires and can be processed individually or in bundles as sheath filaments.

Suitable as core filaments are a number of high-strength filaments known per se. As core filaments are preferably used aramide, fibers, and in particular para-aramide fibers. They have extremely high tensile strength and therefore are suitable for high loading. Moreover, they have excellent resistance to shearing so that they can also be used as fishing line when catching predatory fish. In such application cases the resistance to shearing is of special significance since otherwise the danger exists that the fish caught on the fishing hook bites through the fishing line. Such fishing line can therefore also be used as cast leader. Aramide fibers have a specific density greater than water so that these sink in water. The desired positive or negative buoyancy can therefore be adjusted in any desired way through the corresponding combination with the above described high-performance filaments based on polyethylene thereby that either the last cited filaments are worked together with aramide fibers into the core or thereby that the sheath constructed of polyethylene filaments is matched exactly to the core comprising aramide fibers.

As core filaments are also suitable the above described metal threads which are used either exclusively or in combination with aramide fibers. Depending on the desired strength, one to twelve discrete threads having a diameter of 0.05 mm can be used. This diameter permits excellent processing concomitant with sufficient pliability in the final product.

Independent of the choice of filaments, in all cases the fusion-adhesive thread can also be placed into the core in order to make possible the targeted bonding.

The production of such line is realized extremely cost-effective since complicated devices can be omitted. Thus, the filaments forming the core including the fusion-adhesive yarn are pulled off the reel simultaneously and guided in parallel. Subsequently, the filaments forming the core and the fusion-adhesive yarn are entwined by further filaments to form the sheath wherein, for example, initially twining takes place in the Z-direction and subsequently in the S-direction. The sheath can be constructed in any desired way by further twining.

Subsequently, the line is heated so that the fusion-adhesive yarn can completely fuse until it is finally incorporated in the fused yarn and penetrates through the filament composite from the inside. It has herein been found to be advantageous to maintain the fishing line for a period of approximately one hour at a temperature of approximately 10° to 25° C. above the melting temperature of the fusion-adhesive yarn. This permits the optimum distribution of the adhesive material.

In the following, the invention will be explained in conjunction with the embodiment example depicted schematically in the Figures. As shown therein, FIG. 1 is a diagrammatic structure of the fishing line, and FIG. 2 is a production process for manufacturing the fishing line.

In the lower portion of FIG. 1 is shown the fundamental structural design of a fishing line. A core 10 is formed by various filament types, namely one para-aramide filament 11 and a UHMW-PE filament 12. Both filaments are guided extending in a straight line so that the extremely high linear load carrying capacity of these fibers can be utilized completely and, on the other hand, no bent sites occur which could weaken the strength. Parallel to core 10 a fusion-adhesive yarn 19 is guided and placed into the filament composite. Subsequently the cross-entwining takes place with filaments 21, 22 which form the sheath 20. The filaments forming sheath 20 are also UHMW-PE filaments which are pulled off two separate spools.

In FIG. 1 the finished fishing line is indicated in the upper partial illustration. By supplying heat thereto the above described filament composite has been heated so that the fusion-adhesive yarn 19 is completely in the fused state. The adhesive points 19' are intended to indicate that the fusion-adhesive yarn 19 permeates matrix-like the filaments 11, 12 of core 10 and the filaments 21, 22 of the sheath 20. In the final condition, therefore the fiber composite is set.

Figure 2:
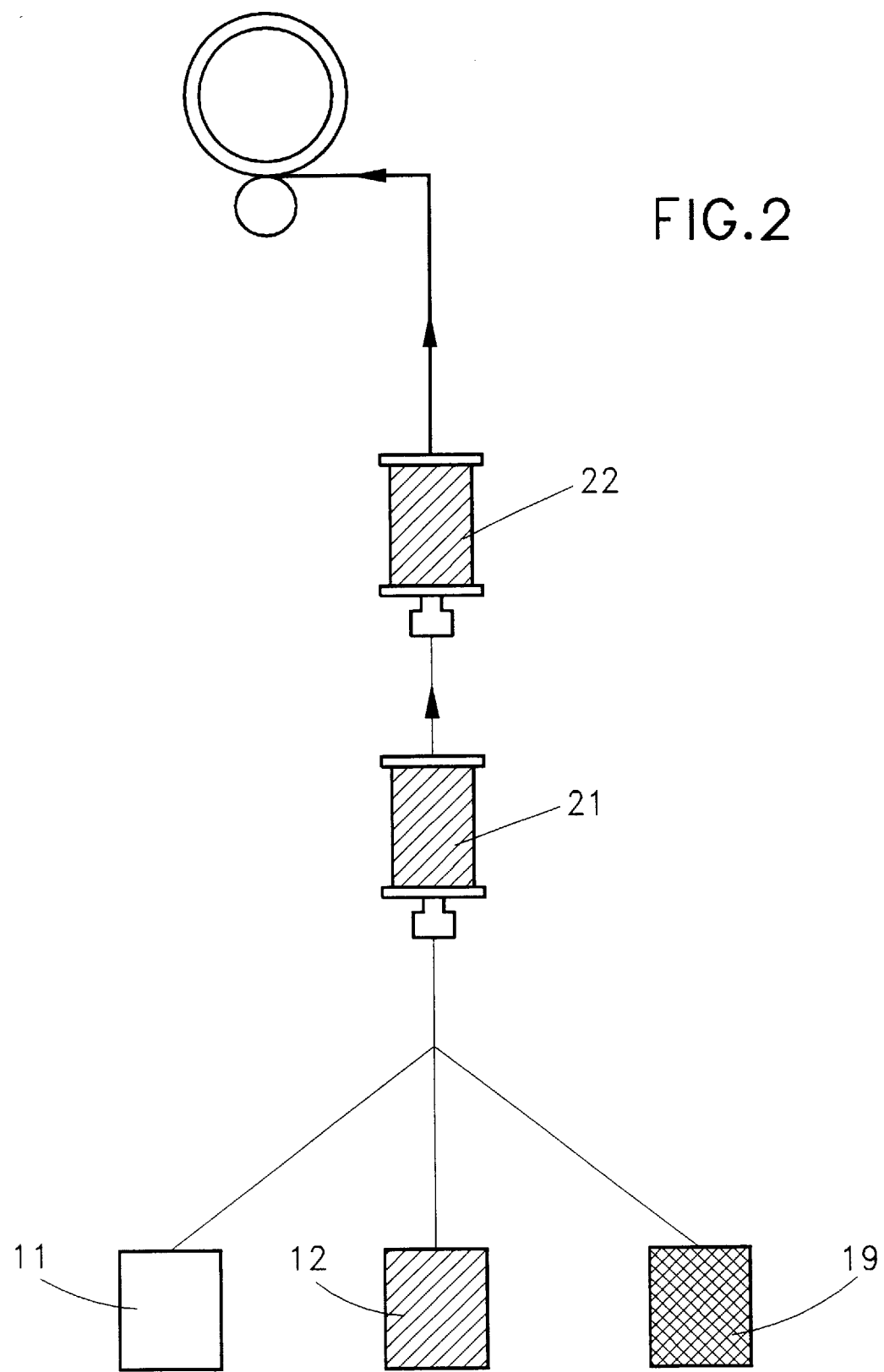

In FIG. 2 the production sequence is again illustrated. Again, the filaments 11, 12 forming the core 10 are pulled off together with the fusion-adhesive yarn 19 and guided in parallel through an eye not shown here. Subsequently, they are entwined first in the Z-direction with the first sheath filament 21 and following that in the S-direction with the second sheath filament 22. Finally, the fishing line is wound up on a spool.

Building on the described basic principle, all conceivable variants of fishing lines can be produced. In the Table, reproduced in the following, is evident that a finely graduated diameter series of fishing lines can be made available and specifically by using a few different starting products.

As core filament, a para-aramide fiber commercially available under the name "Kevlar" was used. Two different titers were processed, namely a first fiber with 60 dtex and a further one with 220 dtex. For thinner fishing lines the first titer was used, for thicker ones the second titer. The strongest fishing line was constructed of two filaments of the second titer placed in parallel.

As sheath filament a high-performance polyethylene fiber commercially available under the name "Dyneema" was used. To construct the different fishing lines three titers were used, namely 110 dtex, 165 dtex and 440 dtex. The table shows that the thinnest fishing line was entwined only with a single filament of the smallest titer in the Z-direction. The stronger fishing lines were constructed through the corresponding variation of titer and number of layers in the way evident in the Table. For the thickest fishing line a total of five layers of the strongest titer were applied.

As the fusion-adhesive yarn a product was used which is commercially available under the name "Grilon". In a first variant a fusion-adhesive yarn with a titer of 23 dtex and a melting temperature of 110° C. was used. A second variant had a titer of 75 dtex at a melting temperature of 85° C. In the Table can be found that the variant with the fine titer was used only for the two thinnest fishing lines, but for all others the stronger titer was used. In the strong fishing lines two fusion-adhesive threads were integrated so as to extend parallel into the core.

In all cases for the purpose of setting, the fishing line was maintained for a period of one hour at the given temperatures. In those cases in which the melting temperature of the adhesive thread was at 110° C., the temperature was maintained at 130° C., i.e. 20° C. above the melting point. In the remaining cases it was sufficient to maintain the temperature at 100° C., and thus approximately 15° C. above the melting temperature of the fusion-adhesive yarn.

Lastly, the Table shows the extreme bandwidth which can be achieved with a few fabricated materials through the corresponding combinations. For example, in the case of the thinnest fishing line the running length is 51800 m/kg and in the case of the thickest fishing line 3600 m/kg.

The examples shown in the following table serve only as explanations wherein the technical expert is in a position to realize through the corresponding variation any desired different line strengths. The described products should only be understood as example of the particular type and can readily be replaced by comparable products by other manufacturers. A further description of the properties in detail was omitted since these can be found in the data sheets of the manufacturers. In the case of the use, not further described here, of metal threads as filaments for the core and/or the sheath it is recommended to use bright-soft stainless steel wires to DIN 17440 with a diameter of 0.05 mm with the material designation No. 1.4301. These can be processed singly or together in bundles of up to 12 individual threads.

TABLE

| Ø mm | DYNEEMA dtex | KEVLAR dtex | GRILON | titer | TEMP. °C. | Running length per kg | Fraction % | |
|---|---|---|---|---|---|---|---|---|
| 0.08 | 110 Z | 60 S | 23 | 193 | 130 | 51800 | K | 31.1 |
|  |  |  | K110 |  |  |  | D | 57.0 |
|  |  |  |  |  | 1 hr |  | GR | 11.9 |
| 0.10 | 110 S |  |  | 303 | 130 | 33000 | K | 19.8 |
|  | 110 Z | 60 | 23 |  |  |  | D | 72.6 |

TABLE-continued

| Ø mm | DYNEEMA dtex | KEVLAR dtex | GRILON | titer | TEMP. °C. | Running length per kg | Fraction % | |
|---|---|---|---|---|---|---|---|---|
| | | | K110 | | 1 hr | | GR | 21.1 |
| 0.121 | 110 S | 60 | 75 | 355 | 100 | 28000 | K | 16.9 |
| | 110 Z | | | | | | D | 62.0 |
| | | | K85 | | 1 hr | | GR | 21.1 |
| 0.14 | 110 S | 220 | 75 | 515 | 100 | 19400 | K | 42.7 |
| | 110 Z | | | | | | D | 42.7 |
| | | | K85 | | 1 hr | | GR | 14.6 |
| 0.18 | 110 S | 220 | 75 | 570 | 100 | 17599 | D | 19.3 |
| | 165 Z | | | | | | D | 28.9 |
| | | | K85 | | 1 hr | | K | 38.6 |
| | | | | | | | GR | 13.2 |
| 0.20 | 165 S | 220 | 75 | 625 | 100 | 16000 | D | 52.8 |
| | 165 Z | | | | | | K | 35.2 |
| | | | K85 | | 1 hr | | GR | 12.0 |
| 0.25 | 165 S | 220 | 75 | 1065 | 100 | 9400 | D | 31.00 |
| | 165 Z 440 | | K85 | | | | D | 41.30 |
| | | | | | 1 hr | | K | 20.60 |
| | | | | | | | GR | 7.1 |
| 0.30 | 440 S | 220 | 75 | 1250 | 100 | 8000 | D | 70.4 |
| | 440 Z | | 75 | | | | K | 17.6 |
| | | | K85 | | 1 hr | | GR | 12.0 |
| 0.50 | 440 S 440 | 220 | 75 | 2130 | 100 | 4700 | D | 82.6 |
| | 440 Z 440 | | 75 | | | | K | 10.3 |
| | | | K85 | | 1 hr | | GR | 7.10 |
| 0.60 | 440 S 440 | 220 | 75 | 2790 | 100 | 3600 | D | 78.9 |
| | 440 Z 440 | 220 | 75 | | | | K | 15.8 |
| | | 440 | K85 | | 1 hr | | GR | 5.3 |

I claim:

1. A fishing line with a core and a sheath encompassing the core, wherein the core as well as the sheath are formed of high-strength filaments, characterized in that the core (10) is formed of filaments (11, 12) and said core is cross-entwined by filaments (21, 22) forming a sheath (20) and that the cove and sheath filaments (11, 12, 21, 22) are bonded by means of a thermoplastic fusion-adhesive filamentary yarn (19) integrated into the fishing line and then is heated to fuse and incorporate completely in the core wherein the thermoplastic yarn permeates the core and the sheath filaments from the core the thermoplastic yarn (19) ceasing to exist throughout a filamentary yarn form.

2. The fishing line according to claim 1, characterized in that the thermoplastic fusion-adhesive yarn (19) extends substantially parallel to the filaments (11, 12) forming the core (10).

3. The fishing line of claim 1, characterized in that the core (10) is entwined by said sheath filaments multiply and alternatingly in the Z-direction (left) and in the S-direction (right).

4. The fishing line of claim 1, characterized in that the filaments (11, 12) forming the core comprise an aramide.

5. The fishing line of claim 4, wherein said aramide is a para-aramide.

6. The fishing line of claim 1, characterized in that the filaments (11, 12) forming the core (10) are high-performance filaments based on polyethylene.

7. The fishing line of claim 1, characterized in that the filaments (11, 12) forming the core (10) are metal threads.

8. The fishing line of claim 1, characterized in that a portion of filaments (11) forming the core (10) comprise an aramide, and the remaining filaments (12) are polyethylene filaments.

9. The fishing line of claim 1, characterized in that a portion of the filaments (11) forming the core (10) are polyethylene filaments and the remaining filaments (12) are metal threads.

10. The fishing line of claim 1, characterized in that the filaments (21, 22) forming the sheath (20) are polyethylene filaments.

11. The fishing line of claim 1, characterized in that the filaments (21, 22) forming the sheath (20) are metal threads.

12. A method for the production of a fishing line, characterized by the steps of:

entwining a core (1) formed of high-strength filaments (11, 12) and a thermoplastic fusion-adhesive filamentary yarn (19) extending essentially parallel to the core (10) by means of high-strength filaments (21, 22) for the purpose of forming a sheath (20), and bonding said core and sheath filaments (11, 12, 21, 22) by means of a thermoplastic fusion-adhesive yarn (19) integrated into said fishing line by heating the fishing line to the point of complete fusion and incorporation of thermoplastic fusion-adhesive filamentary yarn (19) in the fishing line, wherein the thermoplastic yarn permeates the core and the sheath filaments from the core the thermoplastic yarn (19) ceasing to exist in a filamentary yarn form.

13. Method as stated in claim 12, characterized in that multiply and alternatingly in th Z-direction (left) and in the S-direction (right) cross-entwining takes place in the production of said sheath about said core.

14. Method as stated in claim 12 or 13, characterized in that the line is heated one hour and is maintained at a temperature which is above the melting temperature of the thermoplastic fusion-adhesive filamentary yarn (19), so as to enable said yarn to be completely fused and incorporated in said fishing line.

* * * * *